May 30, 1972         R. H. WIESE        3,666,479
PRINT CONTAINING DIFFERENT NUMBERS OF DOTS IN
LIGHT AND DARK TONAL AREA

Filed Jan. 3, 1967                           5 Sheets-Sheet 1

INVENTOR:
RAYMOND H. WIESE
BY Gravely, Lieder & Woodruff
ATTORNEYS.

May 30, 1972 R. H. WIESE 3,666,479
PRINT CONTAINING DIFFERENT NUMBERS OF DOTS IN
LIGHT AND DARK TONAL AREA
Filed Jan. 3, 1967 5 Sheets-Sheet 2
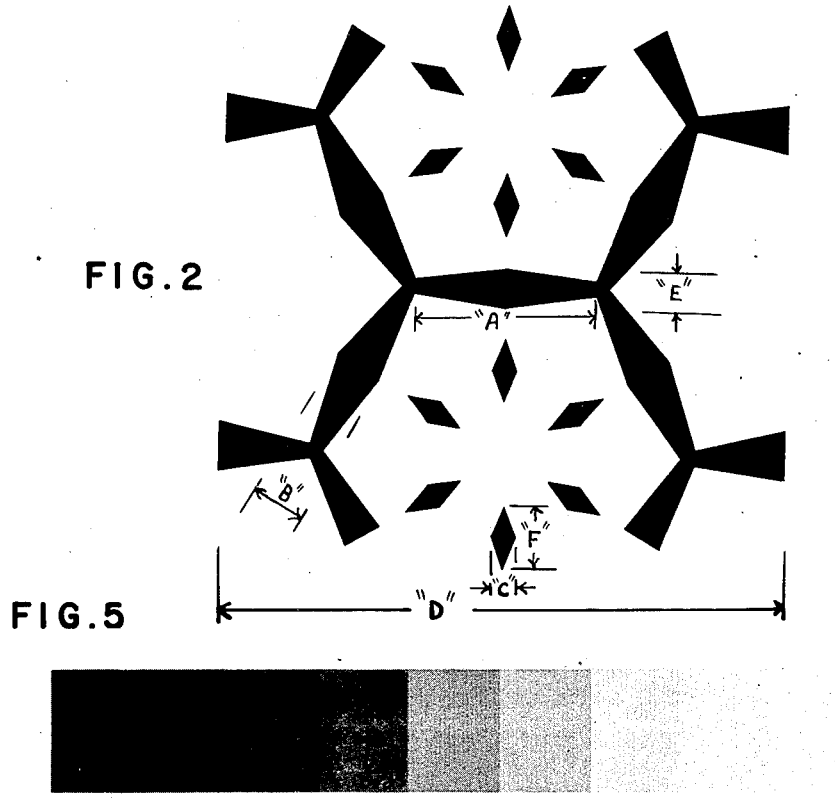
FIG. 2
FIG. 5
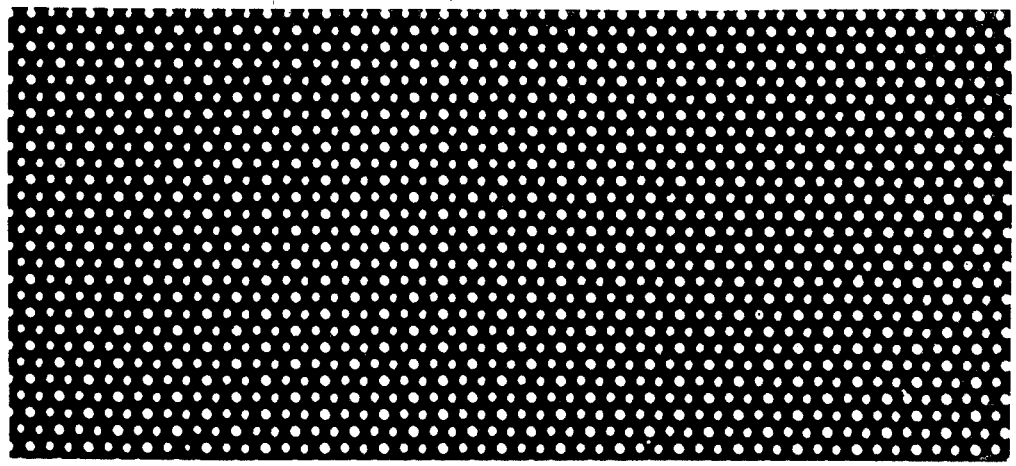
FIG. 4
INVENTOR:
RAYMOND H. WIESE
BY Gravely, Lieder & Woodruff
ATTORNEYS May 30, 1972 R. H. WIESE 3,666,479
PRINT CONTAINING DIFFERENT NUMBERS OF DOTS IN
LIGHT AND DARK TONAL AREA
Filed Jan. 3, 1967 5 Sheets-Sheet 4

United States Patent Office 3,666,479
Patented May 30, 1972

3,666,479
PRINT CONTAINING DIFFERENT NUMBERS OF DOTS IN LIGHT AND DARK TONAL AREAS
Raymond H. Wiese, 4536 Holly Ave.,
St. Louis, Mo. 63115
Filed Jan. 3, 1967, Ser. No. 606,926
Int. Cl. G03f 5/06, 5/00
U.S. Cl. 96—116                    7 Claims

ABSTRACT OF THE DISCLOSURE

A method for producing a halftone screen which contains a different number of dots in different tonal areas and a contact print made from the use of this screen.

---

The present invention relates to a novel print and/or negative suitable for use in offset, letterpress and gravure printing, and to a contact screen suitable for making said print. The present invention particularly relates to a print in which the image is reproduced by series of spaced dots wherein there is a regular variation in the number and size of the dots in the lighter and darker areas.

The present invention also specifically relates to novel contact screens for making the aforesaid prints and to methods of making said screens.

At present in the graphic arts, there are two main principles employed to reproduce photographs, wash drawings, transparencies, etc.

The first principle utilizes a variation in the size of black dots. In the darker areas of a photograph, the black dots are large, while the white dots are small. The relative size of the black and white areas and dots change as the tones become lighter until in the grey areas or off white areas, the black dots are small and the white areas are large.

The principle of varying the size of the dots is used in all letterpress and offset lithography. There have been attempts to use this principle in gravure printing which by its nature requires a different pattern of dots than either letterpress or offset lithography, since in letterpress or lithography black dots may join, while in gravure the individual ink cells (which print as dots) must either not join or just barely join. Henderson, Zeese-Wilkinson, and reverse halftone are some of the methods utilizing only this principle in gravure.

The second basic principle presently used in the graphic arts is employed in gravure printing, and involves a variation in density in the photographic elements (continuous tone) and a variation in depth of printing cell on the gravure plate. In other words, for a dark tone a lot of ink comes out of a deep cell, and for a lighter tone a small amount of ink comes out of a shallow cell. Conventional gravure printing utilizes this method only.

There have been many methods which combine the variation in size of dots or ink cells with a variation in depth of ink cells, such as Dultgen and International-Wattier and others. Although these methods give good results, they are lengthy, costly in materials and require extreme precision of register.

In the present invention, an entirely new principle is utilized; namely, varying the number of dots, preferably in a regular manner, in order to give more sharpness and greater variation in shading.

This principle normally is combined with a variation in the size of the dots, and also may be combined with a variation in the depth of the ink cells. The present invention may be applied to letterpress and offset printing, but is principally for gravure printing.

One of the principal objects of the present invention is to provide a print wherein there is a greater range of tone values than is possible with present prints.

It is another object of the present invention to provide a print or negative having a regular difference in the number of dots defining the lighter and darker areas to achieve a sharp, clear picture with a large range of shading, particularly in the lighter areas.

Another object of the present invention is to provide a method whereby a photograph can be reproduced in an offset, letterpress, or gravure print wherein a varying number of dots (said dots also varying in size) delineate the lighter and darker areas of the photograph.

Still another object is to provide a method of making a print which has a regular variation in the number of dots in the lighter and darker areas.

Another object of the present invention is to provide a method of making a gravure print having sharper images in the lighter areas by varying the number of dots as well as varying their size.

A further important object of the present invention is to provide a contact screen having a regular pattern of clear dots and grey dots reproduced thereon.

Still another object is to provide a method of making a print using the aforesaid contact screens.

A further object is to provide a method of making a contact screen having regular hexagonal pattern of a clear dot and two cloudy or grey dots using a glass screen having diamond shaped openings and a black to white ratio of 2:1.

These and other objects and advantages will become apparent hereinafter.

The present invention comprises a print or negative suitable for use in offset, letterpress or gravure print wherein the image is reproduced with a varying number of spaced dots, the lighter areas having less dots of smaller size than the dark areas. The present invention further comprises a contact screen having clear and cluody openings used in making said prints. Additionally the present invention includes a method of making such a contact screen.

In the accompanying drawings wherein like numerals refer to like parts wherever they occur:

FIG. 2 is a fragmentary enlarged view of the diaphragm used in the apparatus of FIG. 1;

FIG. 4 is a photograph of a portion of the contact screen made using the set of FIGS. 1–3;

FIG. 5 is a reproduction of a conventional grey scale used in the graphic arts;

Figure 1:
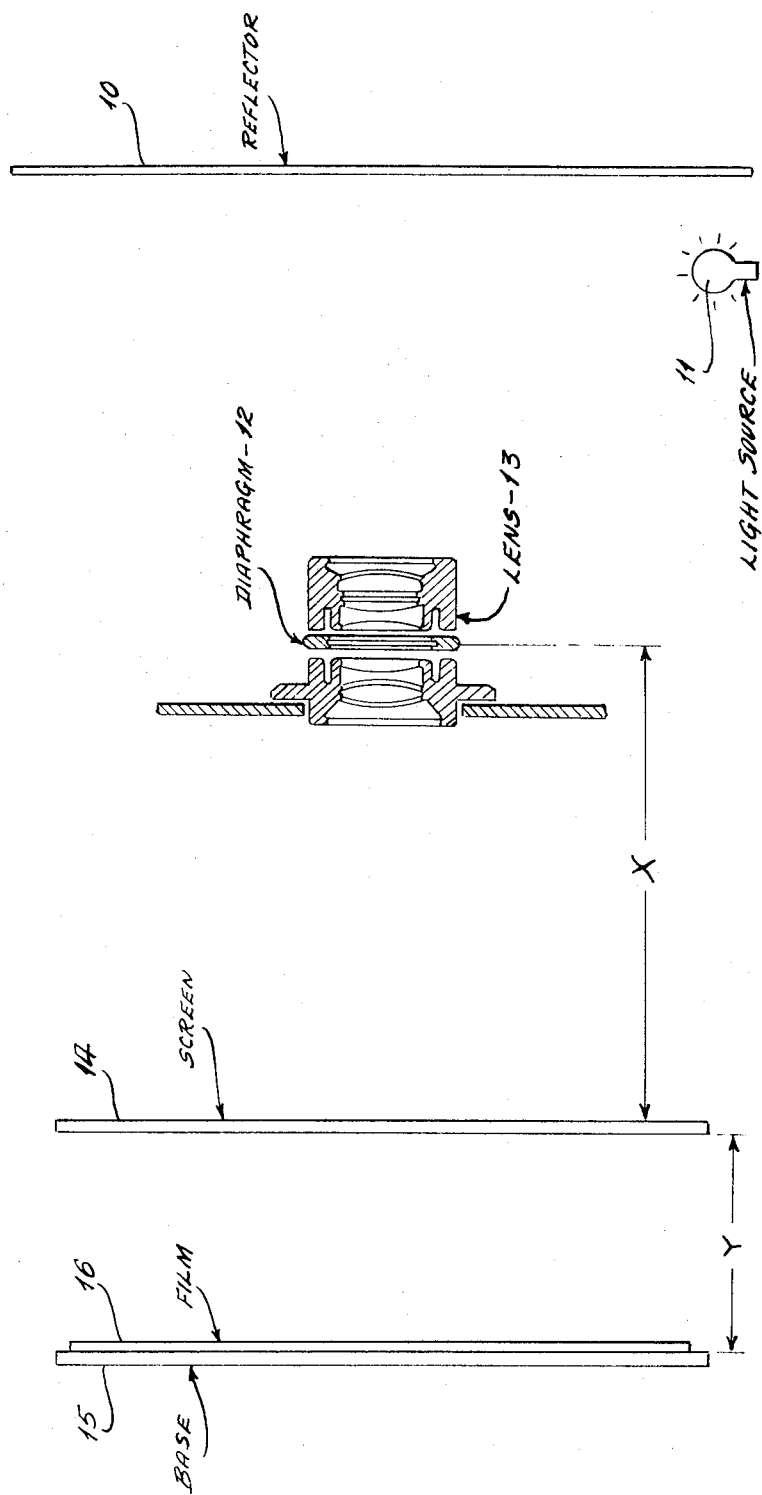
FIG. 1 is a diagrammatic representation of an apparatus set up for making a contact screen for use in the present invention.

FIG. 1 shows a schematic arrangement for making the contact screens which are used to make the halftone reproductions utilizing the present invention. The setup shown in FIG. 1 includes a reflecor 10, a light source 11 in front of the reflector 10, a diaphragm 12 within a lens 13 positioned between the reflector 10 and a screen 14, a base 15 against which a film 16 is positioned. The lens 13 may be omitted in certain setups. The film 16 is a distance Y from the screen 14, and the screen 14 in turn is a distance X from a diaphragm 12. In the shown setup Y is 0.375″ and X is 43.125″. These distances can be varied depending on type of lens, screen, diaphragm, etc., as will be apparent to those skilled in the art.

A suitable monograph on the use of contact screens is entitled "Kodagraph Contact Screens" published by Eastman Kodak Company.

The purpose of ordinary contact screens is to produce dots regardless of the amount of grey tone and to have the same number of dots in each tone. Differences in tone are achieved only by varying the size of the dots in the different tones.

In the present invention the ultimate halftone reproduction not only utilizes a variance in dot size, but in the lower range of greys the number of dots also is varied. This adds to the overall contrast of the entire picture.

In the contact screens of the present invention, the screen is so constructed as to multiply the number of dots available for reproducing an image. In the overall picture or halftone reproduction made from such screens, the contrast will be greater since only the normal number of dots will be produced in the lighter tones of the ultimate halftone reproduction.

In addition, contact screens available today are based on a checkerboard pattern, and one aspect of the present invention is to provide a hexagon or honeycomb pattern in the halftone reproduction. The advantage of the hexagone pattern is that it reproduces detail better since all dots are equidistance from each other, whereas with a checkerboard pattern the dots across the diagonal are 1.41 times the distance from each other of the dots along the sides of the square. If the detail falls along the diagonal it is not reproduced as clearly as if it were to fall along the sides of the square. Also, in rotogravure work the etching dots tend to round to a circle and with a hexagon type pattern there is less open space between the dots.

While the bulk of the following description will be based on the hexagon pattern, the invention is also applicable to the checkerboard pattern, and in this case the dot pattern would be 1 to 2 to 4 or 2 to 4, rather than the 1 to 3 patterns of the hexagon arrangement.

Figure 3:
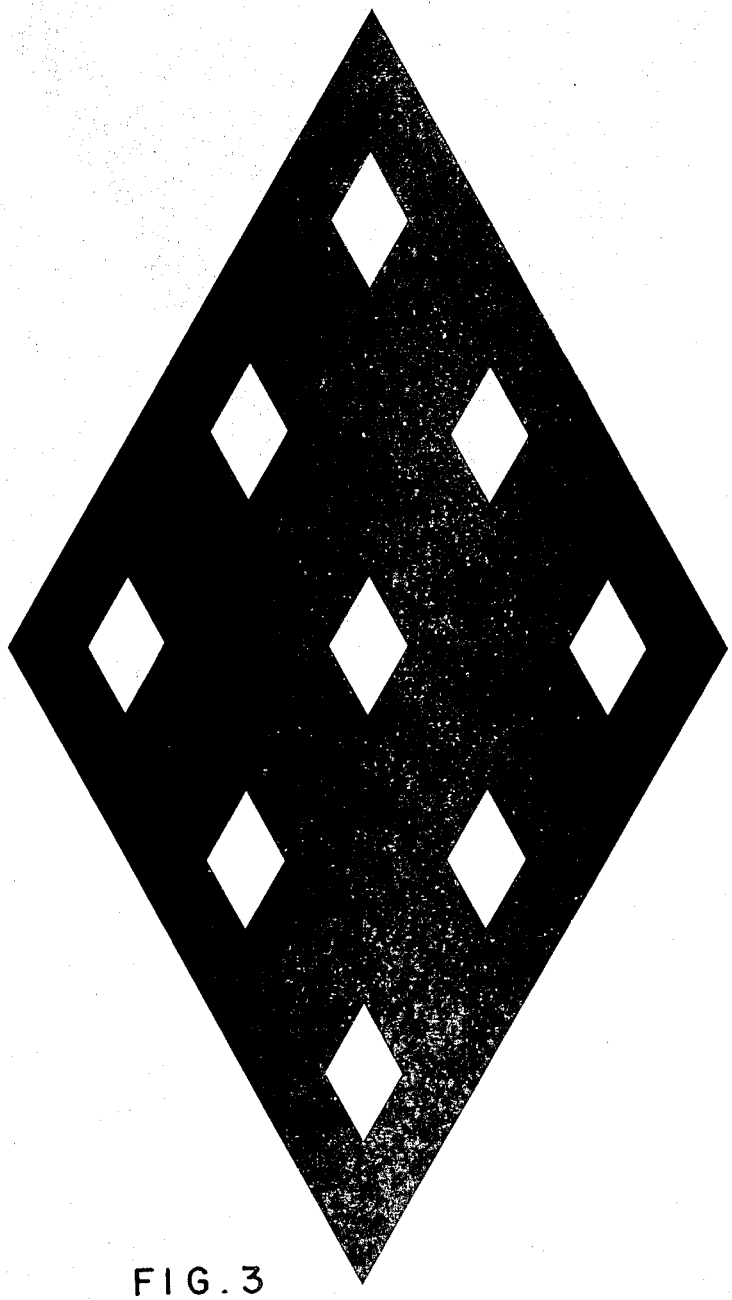
FIG. 3 is a fragmentary enlarged view of the screen used in the apparatus of FIG. 1.

In making the hexagon screen, an aperture or diaphragm 12, as shown in FIG. 2, is used. Also, a unique diamond screen 14, as shown in FIG. 3, is used. In the screen of FIG. 3 the lines cross at 60° and 120° and the proportion of clear to black is 1 to 2. Normally in a checkerboard pattern screen the lines cross at 90° and are in a 1 to 1 white to black or clear to black ratio.

The diaphragm 12 is basically formed on a hexagon pattern. The drawing of FIG. 2 is relatively accurate, but enlarged. The actual sizes of the openings (depicted in black) based on the screen size and the setup distances of FIG. 1 is as follows:

A=0.384"   D=1.15"
B=0.1"     E=0.08"
C=0.05"    F=0.128"

The effect of using the screen 14 and the diaphragm 12 is that the image of the diaphragm 12 is reproduced 110 times per inch on the film 16 or through each aperture of the screen 14. Since the screen 14 is 110 lines per inch, this is the number of reproductions per inch on the film 16 or contact screen. The particular diaphragm 12 shown in FIG. 2 produces a contact screen having a diagonal or hexagon pattern with one clear dot and two cloudy dots in each direction with black separating all of the dots. In the photograph of FIG. 4, which is a photograph of the contact screen made using the procedures of FIG. 1, including the screen of FIG. 3 and the diaphragm of FIG. 2, the centers of each of the apertures should be equidistant from each other and one clear dot is followed by two slightly grey dots or apertures in all directions. The grey apertures are slightly larger than the clear apertures. FIG. 4 shows the clear dots as being larger than the grey dots, but this is a result of distortion incurred in reproducing the screen or Bristol board, and the present explanation is designed to clear up any uncertainty or questions which may be caused by the difficulty of photographing a screen. A negative had to be made and printed and enlarged, and in the process the relative sizes of the clear and grey dots became reversed. Since the present screen is a handmade sample, it is apparent that the basic pattern is clearly shown.

In a halftone reproduction made using the contact screen of FIG. 4, the very light areas would have 110 lines per inch whereas the darker areas have the square root of 3 times 110 lines per inch. In other words, for a 110 lines per inch screen there are approximately 190 lines per inch in the darker tones of the final halftone reproduction. Thus while there are a total of three times as many dots in the darker areas, there are only the square root of 3 times as many dots in the linear direction.

Figure 6:
FIG. 6 is a series of patterns of the grey scale of FIG. 5 made in halftone reproductions using conventional reproduction techniques and the techniques of the present invention.
Figure 6:
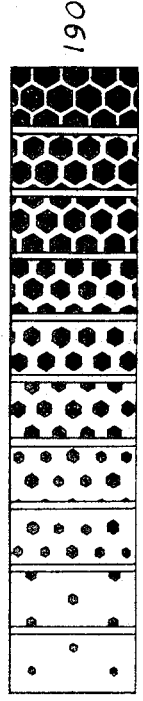
Figure 6:
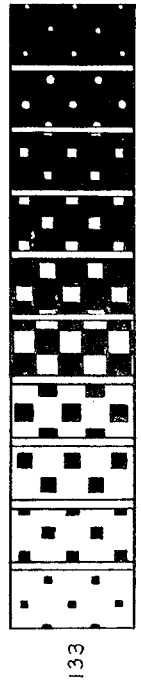
Figure 6:
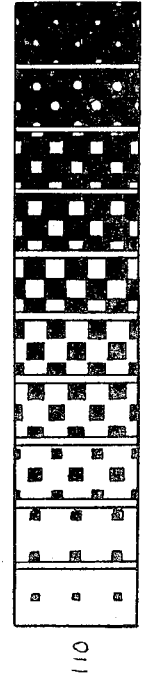
Figure 6:
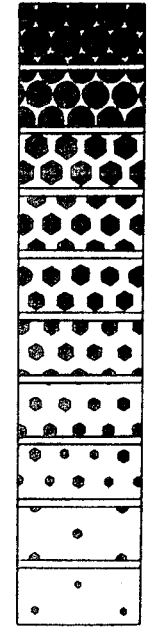

FIG. 5 shows a chart of a standard grey scale with white to black tones. This is a tool conventionally used in the graphic arts. FIG. 6 shows patterns of the tones which are formed utilizing the conventional checkerboard pattern, a variable number halftone checkerboard pattern and a variable number halftone hexagon pattern both for offset and letterpress printing and for rotogravure printing. Thus one can see that the lighter areas contain the standard number of dots per linear inch, whereas in the darker areas the number of dots is multiplied by the square root of the degree of multiplication.

In addition, using the checkerboard pattern and suitable apertures in the diaphragm, the multiplication can again be doubled so that, for example, utilizing a standard 110 lines per inch glass screen the number of dots can be increased to 156 per inch in the intermediate tones and 220 per inch in the extremely dark tones.

Figure 7:
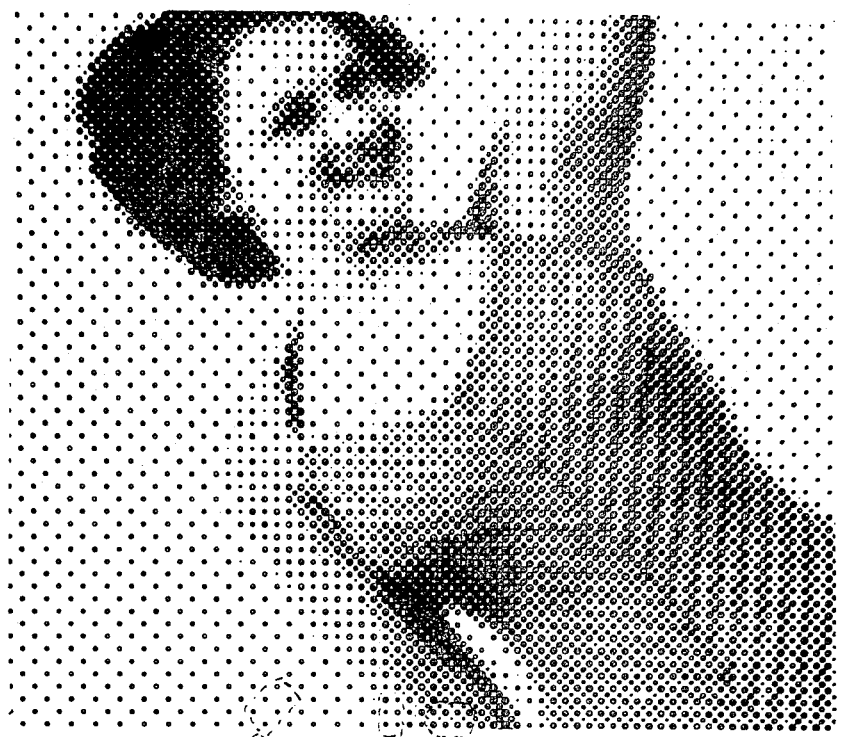
FIGS. 7 and 7a are halftone reproductions made according to the present invention.
Figure 7A:
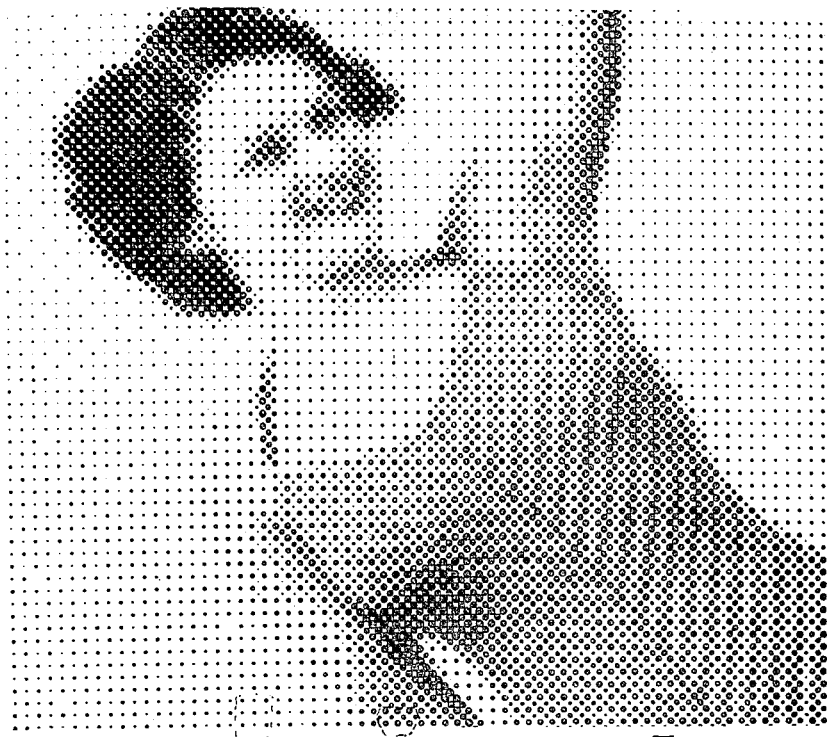

The halftone reproduction shown in FIGS. 7a and 7 show halftone reproductions using checkerboard patterns with the number of lines per inch having been multiplied. FIG. 7 shows a 1 to 2 to 4 ratio of total dots or a multiplication effect which in turn results in a 1 to 1.41 to 2 increase in lines per inch. As may be seen in FIG. 7 in the area marked I, this is in effect a 1 area, and area marked II is in effect a 2 area and the area marked III is a 4 area.

FIG. 7a shows a 2 to 4 increase in the number of dots or in effect a 1 to 2 increase in lines per inch. The area marked IV shows a 2 area and the area marked V is in effect a 4 area.

Thus it is seen that the present invention achieves all of the advantages sought therefor, and particularly provides a process of making a halftone reproduction having less number of dots in the lighter areas and also a contact screen for making such a halftone reproduction.

The present invention is intended to cover all changes and modifications of the examples of the invention herein chosen for purposes of the disclosure, which do not constitute departures from the spirit and scope of the invention.

What is claimed is:

1. An improved halftone reproduction comprising dots of varying sizes, there being a predetermined uniform number of dots per linear inch in the darker areas and a predetermined lesser uniform number of dots per linear inch in the lighter areas.

2. A reproduction as defined in claim 1 wherein there are intermediate shaded areas having a predetermined uniform number of dots which is different from the number of dots in the darker and lighter areas.

3. A reproduction as defined in claim 1 wherein the number of dots in the darker areas is two times the number of dots in the lighter areas.

4. A reproduction as defined in claim 1 wherein there are four times as many dots in the darkest areas as are in the lightest areas and including intermediate shaded areas having two times as many dots as the lightest areas.

5. A reproduction as defined in claim 1 wherein there are three times as many dots in the darker areas as the number of dots in the lighter areas.

6. The reproduction as defined in claim 5 wherein the pattern of the dots is hexagonal.

7. A method of making the contact screen including the steps of positioning a diamond shaped screen having a clear to black ratio of 1:2 and with the lines intersecting at 60° and 120° between unexposed film and a diaphragm having a hexagon pattern, exposing said film so that the hexagon pattern is reproduced through the diamond screen on the film as a repeating hexagonal pattern consisting of a clear dot separated by two grey dots to produce a contact screen.

References Cited

UNITED STATES PATENTS

| | | | |
|---|---|---|---|
| 1,374,813 | 4/1921 | Brasseur | 96—116 |
| 3,258,341 | 6/1966 | Riemerschmid et al. | 96—116 |
| 1,919,481 | 7/1933 | Rowell | 96—116 |
| 3,340,061 | 9/1967 | McCarthy | 96—116 |
| 3,249,437 | 5/1966 | Eekhout | 96—116 |
| 3,493,381 | 2/1970 | Manrer | 96—116 |

FOREIGN PATENTS

| 1,382,265 | 11/1964 | France | 96—116 |
|---|---|---|---|

GEORGE F. LESMES, Primary Examiner

R. E. MARTIN, Assistant Examiner

U.S. Cl. X.R.

96—45, 38

UNITED STATES PATENT OFFICE
CERTIFICATE OF CORRECTION

Patent No. 3,666,479   Dated May 30, 1972

Inventor(s) Raymond H. Wiese

It is certified that error appears in the above-identified patent and that said Letters Patent are hereby corrected as shown below:

The attached sheet 2 of the drawings showing Figs. 2, 4 and 5 should be added, but will apply to the Grant only.

Signed and sealed this 17th day of December 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,666,479            Dated May 30, 1972

Inventor(s) Raymond H. Wiese

It is certified that error appears in the above-identified patent and that said Letters Patent are hereby corrected as shown below:

PATENTED MAY 30 1972            3,666,479

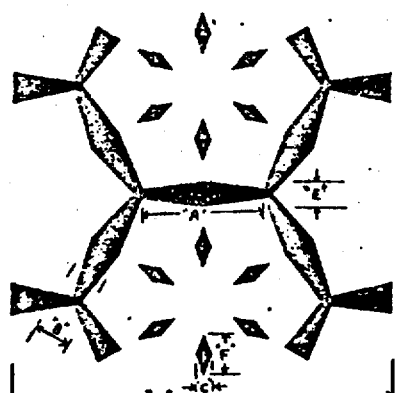

FIG. 2

FIG. 3

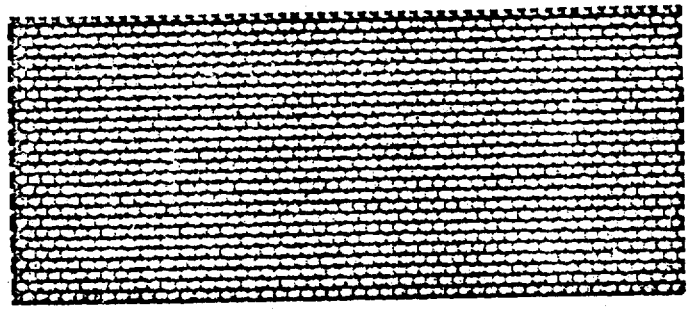

FIG. 4

INVENTOR:
RAYMOND H. WIESE
BY Gravely, Lieder & Woodruff
ATTORNEYS